US012529593B2

(12) United States Patent
Otsuka et al.

(10) Patent No.: US 12,529,593 B2
(45) Date of Patent: Jan. 20, 2026

(54) WEIGHING APPARATUS HAVING AN ABNORMALITY DETECTION MEANS

(71) Applicant: A&D COMPANY, LIMITED, Tokyo (JP)

(72) Inventors: Hideki Otsuka, Saitama (JP); Tsutomu Kowa, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 306 days.

(21) Appl. No.: 18/273,320

(22) PCT Filed: Jan. 18, 2022

(86) PCT No.: PCT/JP2022/001529
§ 371 (c)(1),
(2) Date: Jul. 20, 2023

(87) PCT Pub. No.: WO2022/158438
PCT Pub. Date: Jul. 28, 2022

(65) Prior Publication Data
US 2024/0118125 A1    Apr. 11, 2024

(30) Foreign Application Priority Data
Jan. 22, 2021  (JP) .................................. 2021-009105

(51) Int. Cl.
*G01G 23/01*   (2006.01)
*G01G 19/00*   (2006.01)

(52) U.S. Cl.
CPC ............. *G01G 23/01* (2013.01); *G01G 19/00* (2013.01)

(58) Field of Classification Search
CPC ......... G01G 19/00; G01G 19/44; G01G 23/01
See application file for complete search history.

(56) References Cited

U.S. PATENT DOCUMENTS

| | | | |
|---|---|---|---|
| 4,739,848 A * | 4/1988 | Tulloch | G01G 3/1402 |
| | | | 73/862.633 |
| 6,546,817 B1 | 4/2003 | Aoki | |
| 11,796,381 B1 * | 10/2023 | Carpenter | G01G 23/166 |
| 2003/0051564 A1 | 3/2003 | Aoki | |

(Continued)

FOREIGN PATENT DOCUMENTS

| | | |
|---|---|---|
| CN | 111351560 A | 6/2020 |
| JP | 2000-298057 A | 10/2000 |

(Continued)

*Primary Examiner* — Natalie Huls
(74) *Attorney, Agent, or Firm* — Studebaker Brackett PLLC

(57) ABSTRACT

Provided is a weighing apparatus that enables occurrence of an abnormality to be noticed. A weighing apparatus includes a rectangular weighing base, weighing sensors disposed at four corners of the weighing base, a control unit configured to calculate a weighed value of a to-be-weighed object on the weighing base based on outputs of the weighing sensors, and an abnormality detection means configured to detect occurrence of an abnormality based on output values of the weighing sensors, and detects occurrence of an abnormality by comparing a sum of output values of a pair of weighing sensors disposed on one side of the weighing base among the weighing sensors with a sum of past output values of the pair of weighing sensors.

11 Claims, 5 Drawing Sheets

(56) References Cited

U.S. PATENT DOCUMENTS

| | | | | |
|---|---|---|---|---|
| 2010/0012393 A1* | 1/2010 | Tanida | ................... | G01G 21/22 |
| | | | | 177/244 |
| 2011/0203857 A1* | 8/2011 | Trautweiler | ......... | G01G 3/1414 |
| | | | | 177/1 |
| 2012/0059626 A1* | 3/2012 | Li | ........................ | G01G 11/003 |
| | | | | 702/173 |
| 2015/0268089 A1* | 9/2015 | Xie | ........................ | G01G 23/00 |
| | | | | 702/101 |
| 2016/0018254 A1* | 1/2016 | Wechselberger | ...... | G01G 23/01 |
| | | | | 177/1 |
| 2017/0205272 A1* | 7/2017 | Zhang | ...................... | G01B 7/20 |
| 2023/0184581 A1* | 6/2023 | Haase | ................ | G01G 23/3707 |
| | | | | 177/50 |
| 2024/0102849 A1* | 3/2024 | Zhang | ................... | G01G 23/01 |

FOREIGN PATENT DOCUMENTS

| | | |
|---|---|---|
| JP | 2002-286539 A | 10/2002 |
| JP | 2013-253835 A | 12/2013 |
| JP | 2015-206681 A | 11/2015 |

\* cited by examiner

WEIGHING APPARATUS HAVING AN ABNORMALITY DETECTION MEANS

TECHNICAL FIELD

The present invention relates to a weighing apparatus such as a weight scale, and particularly, to a large weight scale to be used in medical facilities.

BACKGROUND ART

A large weight scale to be used in medical facilities has a large-area weighing base, and on four corners of a lower surface of the weighing base, weighing sensors are mounted, and it then converts by the four weighing sensors all loads into one measurement value to be displayed (refer to Patent Literature 1).

Recently, such a large weight scale is also devised in consideration of allowing the elderly as to-be-weighed subjects to easily get on and off the weighing base, so that the weighing base is positioned as low as possible. As a result, a gap between the weighing base and the floor surface is reduced, which causes a problem in which the weighing base easily comes into contact with bumps and dips on the floor surface. Further, there is also occurrence of a problem in which a foreign object such as a pen enters the gap between the weighing base and the floor surface and comes into contact with the lower surface of the weighing base.

Similar problems may also occur with a small weight scale for home use. However, in the case of a small weight scale, as its weighing base is light in weight, when a floor or a foreign object comes into contact with the weighing base, the percentage of an error caused by this contact is large, which allows for the occurrence of an abnormality to be noticed. Further, in the case of a small weight scale, as the weighing base is small and light in weight, when an abnormality is sensed, the weight scale including the weighing base can be lifted and checked, so that the cause of the abnormality can also be found.

CITATION LIST

Patent Literature

Patent Literature 1: Japanese Published Unexamined Patent Application No. 2015-206681

SUMMARY OF INVENTION

Technical Problem

However, in the case of a large weight scale for medical facilities, as the weighing base itself is heavy in weight, the percentage of an error that occurs when the weighing base comes into contact with a floor or a foreign object is small, so that it is difficult to notice the occurrence of an abnormality. Further, in the large weight scale, it is difficult to lift and check the large and heavy weighing base, so that it is difficult to find the cause of the abnormality. Therefore, in a conventional large weight scale, even when a contact abnormality caused by a contact of the weighing base with a floor surface or a foreign object occurs and an inaccurate value is displayed, the displayed value may be directly employed without the fact being noticed.

In particular, this problem is especially likely to occur immediately after a large weight scale is moved and installed. That is, when the large weight scale is moved to a position for use, and the weighing base is installed on a floor surface, an abnormality is likely to occur if a foreign object or the like is caught under the weighing base or the weighing base comes into contact with a wall or the like.

The present invention was made in view of these circumstances, and an object thereof is to provide a weighing apparatus capable of detecting an abnormality that occurs when the weighing apparatus is moved and installed.

Solution to Problem

In order to achieve the object described above, an invention set forth in claim 1 provides a weighing apparatus including a rectangular weighing base on which a to-be-weighed object is placed, weighing sensors disposed at four corners of the weighing base, and a control unit configured to calculate a weighed value of the to-be-weighed object on the weighing base based on output values of the weighing sensors, in which the weighing apparatus includes an abnormality detection means configured to detect occurrence of an abnormality based on a sum of output values of a pair of the weighing sensors disposed on one side of the weighing base.

The inventor of the present invention took notice of the fact that, when such an abnormality in that a foreign object or the like came into contact with the weighing base occurred, a sum of output values of a pair of weighing sensors disposed on one side of the weighing base greatly changed. When described specifically, the inventor acquired knowledge that, in the case where weighing sensors are disposed at four corners of the weighing base and outputs are made from the respective sensors, an amount of change in sum of all output values might be small even when there is an abnormality, so that this cannot be conveniently used for abnormality detection, on the other hand, the respective output values often change even when there is no abnormality, so that these cannot also be conveniently used for abnormality detection, and in contrast, a sum of output values of a pair of weighing sensors disposed on one side of the weighing base greatly changes in many cases where an abnormality due to a contact with a foreign object or the like occurred, and this can be used for abnormality detection. The present invention was made based on this knowledge, and a sum of output values of a pair of weighing sensors disposed on one side of the weighing base is monitored, so that occurrence of an abnormality can be detected.

According to an invention of claim 2, in the invention of claim 1, the abnormality detection means detects the abnormality by comparing a sum of output values of the pair of weighing sensors with a sum of past output values of the pair of weighing sensors. For example, a sum of past output values in a past normal state is stored in advance, and by comparison with this, occurrence of an abnormality can be detected.

According to an invention of claim 3, in claim 2, the past output values are past output values in a no-load state of the weighing base, and the abnormality detection means compares a sum of output values of the weighing sensors at the time of power supply input with the past output values. According to the present invention, an abnormality can be detected at the time of power supply input, and in particular, an abnormality related to installation can be detected.

According to an invention of claim 4, in any one of claims 1 to 3, the abnormality detection means identifies a pair of weighing sensors in which an abnormality is judged to have occurred, and makes a notification of them. According to the present invention, a pair of weighing sensors that have detected occurrence of an abnormality are identified and a notification of them is made, so that a position where the abnormality has occurred can also be grasped.

According to an invention of claim 5, in any one of claims 1 to 4, the weighing apparatus is movable, and the abnormality detection means detects an installation abnormality when the weighing apparatus is moved and installed. The present invention is effective for a movable weighing apparatus such as a weight scale, and an abnormality immediately after installation can be detected. The present invention is particularly effective for a large weight scale having wheels for facilitating movement of the weighing apparatus.

Advantageous Effects of Invention

According to the present invention, an abnormality is detected based on a sum of output values of a pair of weighing sensors disposed on one side of a weighing apparatus, so that even in a large weighing apparatus having a large or heavy weighing base, occurrence of an abnormality can be grasped, and an operator can respond promptly.

DESCRIPTION OF EMBODIMENTS

Figure 1:
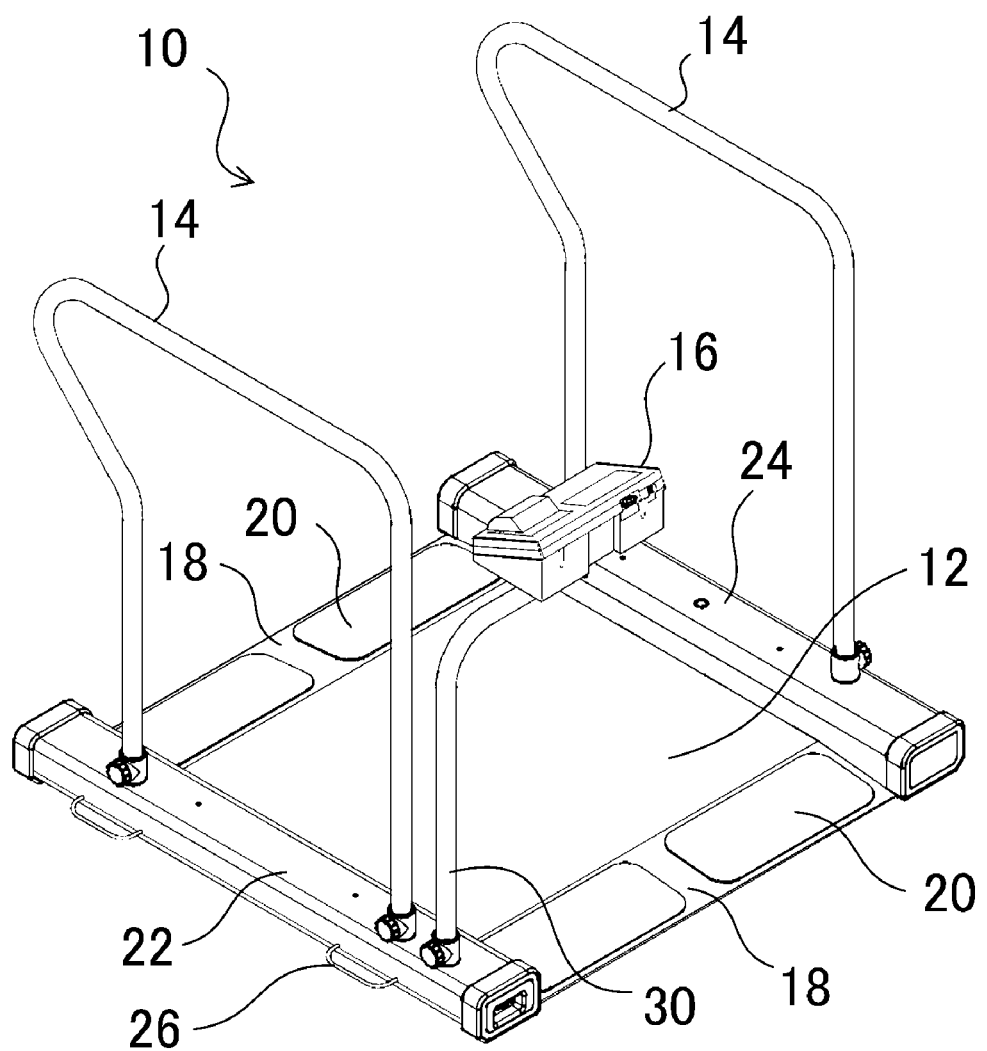
FIG. 1 is a perspective view of a weighing apparatus to which the present invention is applied.
Figure 2:
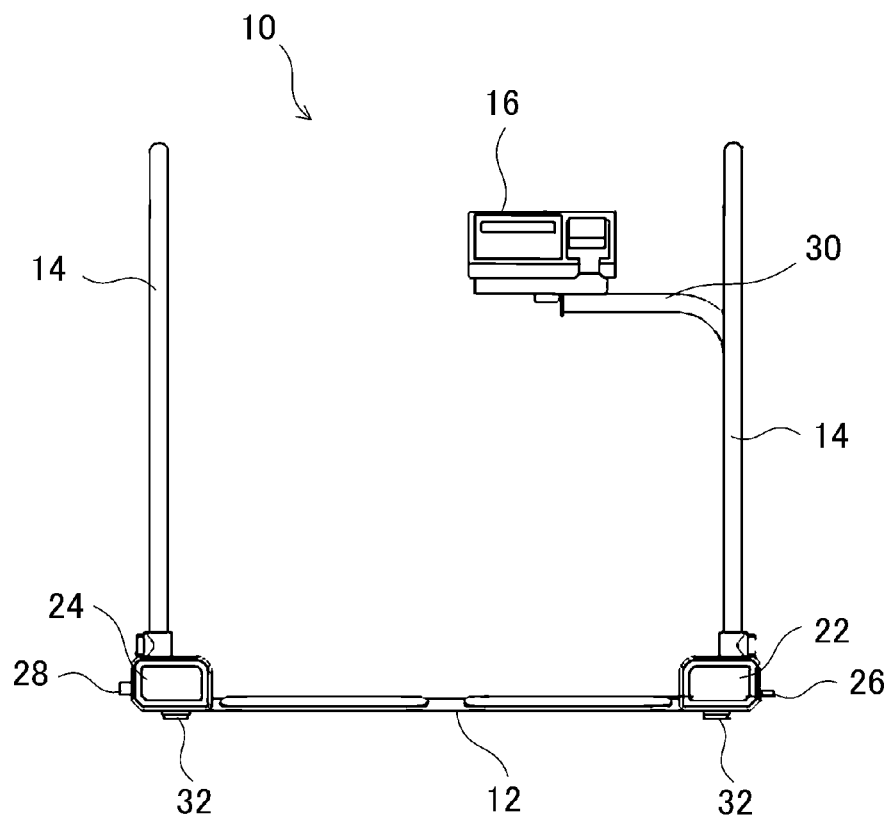
FIG. 2 is a front view of the weighing apparatus of FIG. 1.
Figure 3:
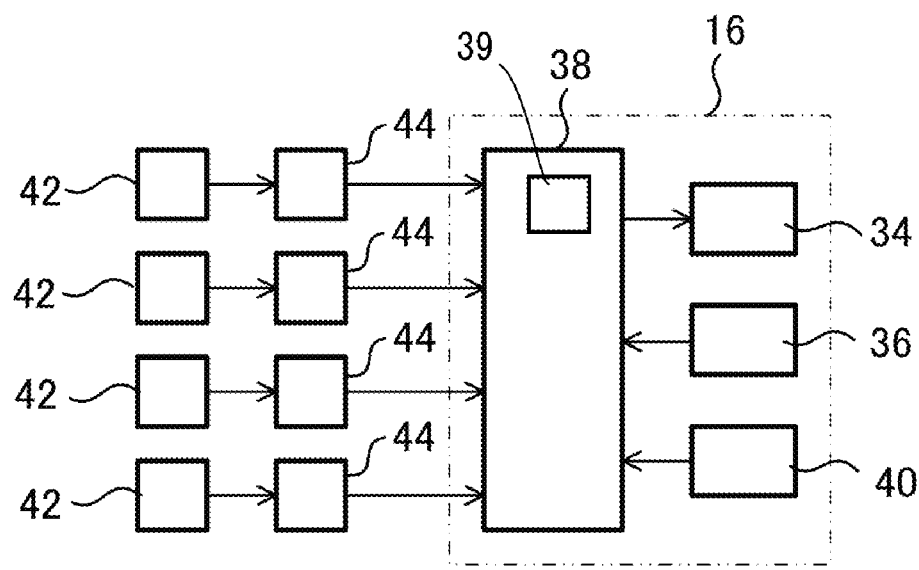
FIG. 3 is a control block diagram of the weighing apparatus of FIG. 1.

Preferred embodiments of a weighing apparatus according to the present invention will be described with reference to the accompanying drawings. FIG. 1 is a perspective view of a weighing apparatus 10, and FIG. 2 is a front view of the weighing apparatus 10. FIG. 3 depicts a control block diagram of the weighing apparatus 10.

The weighing apparatus 10 illustrated in these figures consists mainly of a weighing base 12, handrails 14, and a display 16. The weighing base 12 is formed into a large rectangular shape, and on this weighing base 12, a to-be-measured subject can get on directly or while sitting in a wheelchair. The weighing base 12 has a flat and sufficiently rigid structure, and is configured by, for example, sandwiching a honeycomb-like reinforced plate (not illustrated) by an iron-made frame body and iron plates from above and below. At both front and rear end portions of the weighing base 12, slopes 18 and 18 are provided so that the weighing base becomes lower outward and the to-be-measured subject easily gets on and off. To each slope 18, a slip resistance 20 is attached so that the to-be-measured subject does not slip when getting on and off.

To both left and right ends of the weighing base 12, side bars 22 and 24 are joined. Each side bar 22, 24 is formed into a hollow columnar shape, and inside it, wiring and an electronic substrate, etc., are stored. Further, onto upper surfaces of the side bars 22 and 24, handrails 14 are attached so that the to-be-measured subject can step up and down while holding the handrails 14.

To an outer side surface of one side bar 22 of the side bars 22 and 24, handles 26 are attached, and to an outer side surface of the other side bar 4, two wheels 28 (refer to FIG. 2) are rotatably attached at a fixed interval. Therefore, the weighing apparatus 10 can be freely moved by moving the weighing base 12 while holding the handles 26 in a state where the weighing base 12 is turned down so that the side bar 22 is on an upper side and the side bar 24 is on a lower side and the wheels 28 are brought into contact with the ground.

Further, on an upper surface of the side bar 22, a pole 30 is attached detachably and turnably beside the handrail 14. The pole 30 is erected vertically, and then bent to be horizontal, and to its tip end, the display 16 is attached. Therefore, by turning the pole 30, the position of the display 16 can be adjusted. The display 16 is provided with a display screen 34 (refer to FIG. 3) for displaying a weighed value and setting conditions, and operation buttons 36 for making various settings. Inside the display 16, a control unit (board, etc.) 38 for performing various arithmetic processings and a power supply (battery, etc.) 40 are provided.

On a lower surface of each side bar 22, 24, as illustrated in FIG. 2, leg portions 32 are provided. The leg portions 32 are provided at both ends of each side bar 22, 24, that is, the respective corner portions of the weighing base 12. Between each leg portion 32 and the side bar 22 or 24, a weighing sensor 42 (refer to FIG. 3) is provided, and the weighing base 12 is supported through the weighing sensors 42. The weighing sensor 42 is a sensor that measures a load applied to the weighing base 12, and for example, a load cell is used. In the present embodiment, as illustrated in FIG. 3, the weighing sensors 42 are configured to make outputs separately, and the outputs can be amplified by amplifiers 44 and transmitted to the control unit 38 inside the display 16. Therefore, in the control unit 38, the outputs of the respective weighing sensors 42 can be compared, and an abnormality diagnosis to be described later can be performed. In other words, the respective weighing sensors 42 are configured to make outputs in a manner in which the outputs can be compared to allow for performing an abnormality diagnosis in the control unit 38 (specifically, an abnormality detection means 39 included in the control unit 38). A detailed configuration of the weighing sensors 42 (although not illustrated) is such that four gauges are affixed to four thin-walled portions of a strain body of a Roberval load cell, and these four gauges are connected to configure a bridge circuit, and their respective output values (=data not converted into a weighed value and not subjected to arithmetic processing or the like) can be judged by the control unit 38.

The control unit 38 is a microcomputer configured by mounting at least a CPU and a memory on an integrated circuit. The control unit performs a control so as to calculate, based on outputs from the four weighing sensors 42, a weighed value of a to-be-weighed object on the weighing base 12 and display the weighed value on the display screen 34 of the display 16. The abnormality detection means 39 is configured software-wise in the control unit 38. The output values of the weighing sensors 42 input to the control unit 38 and data in the memory, etc., are also provided to the abnormality detection means 39. Based on these, the abnormality detection means 39 performs arithmetic operations, and detects occurrence of an abnormality from arithmetic operation results. The abnormality detection means 39 calculates all sums of output values of pairs of weighing sensors 42 (that is, four sums in four combinations) disposed on each one-side of the weighing base 12, and by using the sums, detects occurrence of an abnormality. Moreover, the control unit 38 is configured to store reference values for the respective sums in the memory, and the abnormality detection means 39 performs abnormality detection by comparing the reference values and the calculated sums.

Figure 4:
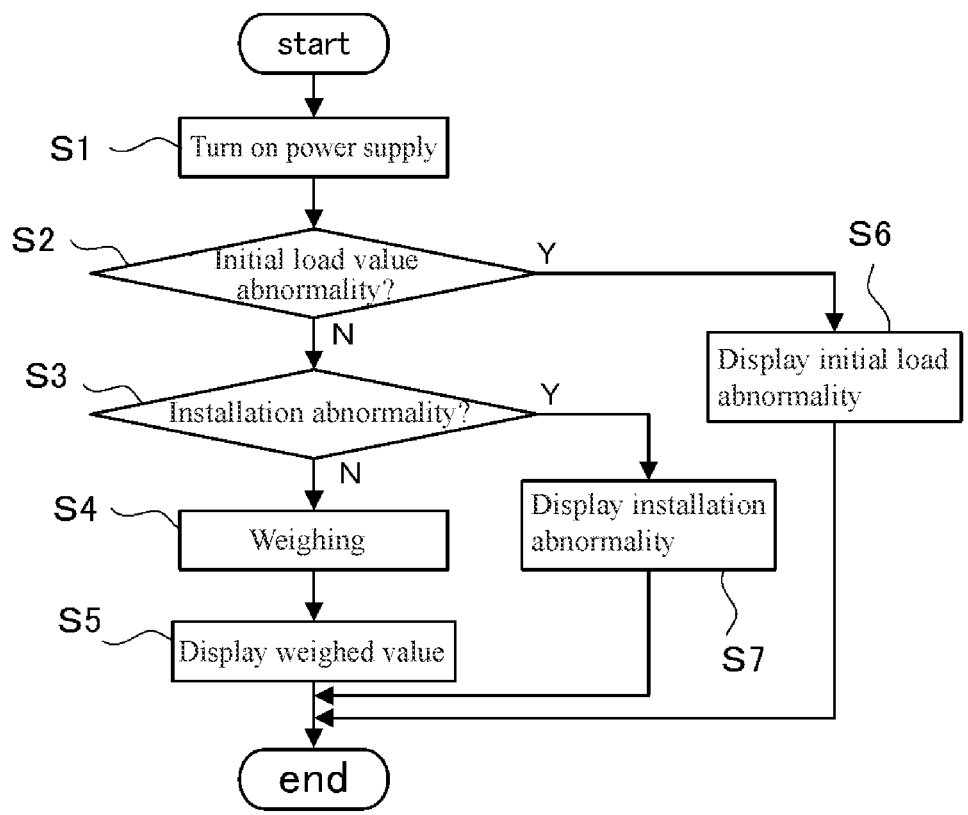
FIG. 4 is a chart illustrating an abnormality diagnosis flow.

FIG. 4 illustrates an example of a control flow for performing an abnormality diagnosis. As illustrated in this figure, when the power supply is turned on (Step S1), first, a determination on an initial load value abnormality is made (Step S2). In this determination, for example, whether a load in excess of ±10% of a maximum weight value has been applied is judged, and when the load is in excess, this is determined to be an initial load value abnormality. Then, when an initial load value abnormality is determined, a display indicating the initial load value abnormality is made on the display screen 34 (Step S6). This function of determining an initial load value abnormality is also equipped in conventional weighing apparatuses, and a detailed description thereof will be omitted.

Next, a determination on an installation abnormality is made (Step S3). In the installation abnormality determination, first, sums of output values of weighing sensors 42 disposed on one-sides of the weighing base 12 among the four weighing sensors 42 are respectively calculated. That is, a sum of output values of two weighing sensors 42 disposed at an entrance side (the side from which a to-be-measured subject gets on) of the weighing base 12, a sum of output values of two weighing sensors 42 disposed at an exit side, a sum of output values of two weighing sensors 42 disposed on the right side (as viewed from the entrance), and a sum of output values of two weighing sensors 42 disposed on the left side, are calculated. Then, whether the values of calculated sums (hereinafter, referred to as calculated values) are respectively within permissible ranges with respect to the reference values is judged. Here, the reference values are sums of output values of the corresponding pairs of weighing sensors 42 calculated in a past normal state, and are stored in advance. The permissible ranges are values obtained in advance by tests, etc., and set for each type of weighing apparatus 10, and for example, set to output values corresponding to approximately 0.1% of the maximum weight value. At the time of comparison, the reference value and the calculated value of the same combination of weighing sensors 42 are compared. As a result of comparison, when any sum exceeds the permissible range, this is determined to be an occurrence of an installation abnormality. Upon the determination, a display indicating the installation abnormality is displayed on the display screen 34 (Step S7).

On the other hand, when it is judged that there is no installation abnormality, weighing processing is performed (Step S4). In the weighing step, weighing is automatically started by a to-be-measured subject getting on the weighing base 12. At this time, a display to urge starting weighing (that is, a display to urge the to-be-weighed subject to get on the weighing base 12) is preferably displayed on the display screen 34. When weighing is started, the control unit 38 calculates one weighed value from the output values of the four weighing sensors 42, and displays the calculated weighed value on the display screen 34 (Step S5).

Next, operation of the weighing apparatus 10 configured as described above will be described.

The weighing apparatus 10 of the present embodiment has a bridge circuit configured by gauges inside each weighing sensor 42, and from the respective weighing sensors 42, output values are obtained. Conventionally, as these output values are meaningless as they are, the output values are promptly converted into one weighed value. However, there is a problem in which, with the weighed value after conversion, it is difficult to detect an abnormality that occurs when a foreign object or the like comes into contact with the weighing base 12. In particular, in a case where the weighing base 12 is heavy in weight, such as in a large weight scale, an amount of change in weighed value is small even when it is caused by a contact of a foreign object or the like with the weighing base 12, so that it is difficult to detect the abnormality.

Therefore, the inventor of the present invention inspected respective output values of the weighing sensors 42, and found that the output values showed very sensitive responses and indicated completely different values even only by reinstalling the weighing base 12 or temporary applying a load or impact to the weighing base 12. For example, there is a case where, with an output value of a certain weighing sensor 42 of "+100 (raw data before conversion into a weighed value)," when the weighing base 12 is reinstalled and the output value of this weighing sensor 42 is inspected again, it then changes to "−100" or "+200" (although being in the same no-load state). Therefore, the output values of the weighing sensors 42 change without depending on whether an abnormality has occurred, so that it is difficult to detect occurrence of an abnormality just by simply monitoring the output values.

The inventor of the present invention further inspected the output values of the weighing sensors 42, and as a result, found that there was a fixed rule in changes in output values as long as the apparatus was in a normal state (=state without an abnormality). That is, as long as it was in a normal state, a sum of output values of a pair of adjacent weighing sensors 42 changes so as to be within a predetermined range with respect to a reference value (a sum of output values in a past normal state). For example, when past output values of a certain pair of weighing sensors 42 are respectively "+100" and "+200", and a sum of these is "+300, the two output values change so as to be within a predetermined range with respect to "+300" as long as the apparatus was in a normal state. Therefore, as long as it was in a normal state, when an output value of one weighing sensor 42 changes from "+100" to "−100", an output value of the other weighing sensor 42 changes to about "+400" so that a sum of these becomes "+300." Conversely, when an abnormality occurs, the sum greatly changes. For example, when an output value of one weighing sensor 42 becomes "−100," an output value of the other weighing sensor 42 changes to "−100," "1000," or the like so that a sum of these changes to greatly deviate from the past sum value "+300." As thus described, a change in sum of output values of a pair of weighing sensors 42 is small in a normal state, and is large when an abnormality occurs. Therefore, in the present embodiment, a sum of output values of a pair of weighing sensors 42 is compared with a sum of past output values of the same pair of weighing sensors 42, and when a difference between them exceeds a threshold, it is judged that an abnormality has occurred.

As described above, since output values of the weighing sensors 42 show sensitive responses, by utilizing a sum of output values for an abnormality diagnosis, occurrence of an abnormality can be detected with a considerably high probability. Therefore, as in the case of a weight scale for medical use, even when the weighing base 12 is heavy or large, occurrence of an abnormality can be detected, and weighing without notice of an abnormality can be prevented.

In the embodiment described above, an installation abnormality is automatically diagnosed, however, without limitation to this, it is also possible that whether to diagnose an installation abnormality can be made selectable, and only when diagnosing is selected, a diagnosis of an installation abnormality is performed.

Further, in the embodiment described above, when an abnormality occurs, it is displayed on the display screen 34, however, an abnormality notification means is not limited to this, and an operator may be notified of occurrence of an abnormality by production of sound or turning-on or flashing of light.

Further, in the embodiment described above, as the reference values, values obtained in advance by tests, etc., or for example, past output values in a no-load state are set and used, however, without limitation to this, sums of output values may be newly stored when a normal state (=a state without occurrence of an abnormality) is judged, and the newly stored values may be used as the reference values by renewal.

Further, in the embodiment described above, it is also possible that a content of an abnormality that occurred is determined. Specifically, a control may be performed so that a database representing a correspondence between a sum of output values of the weighing sensors 42 (or a difference between a calculated value and a reference value) when an abnormality occurred and an abnormality content is stored in advance in the memory of the control unit 38, and the abnormality detection means 39 diagnoses an abnormality content based on a sum of output values and the database, and displays a result on the display screen 34.

In the embodiment described above, occurrence of an abnormality is detected based on a sum of output values of a pair of weighing sensors 42, and in addition to this, it is also possible that occurrence of an abnormality is detected based on output values of the respective weighing sensors 42. For example, it is also possible that past (normal-time) output values of the respective weighing sensors 42 are stored in advance in the memory of the control unit 38, and the abnormality detection means 39 compares the past output values and output values obtained during measurement, and when a difference between them exceeds a permissible range, occurrence of an abnormality is judged. In this case, by performing along with the diagnosis based on a sum of output values of a pair of weighing sensors 42, an abnormality detection can be more reliably performed.

Figure 5:
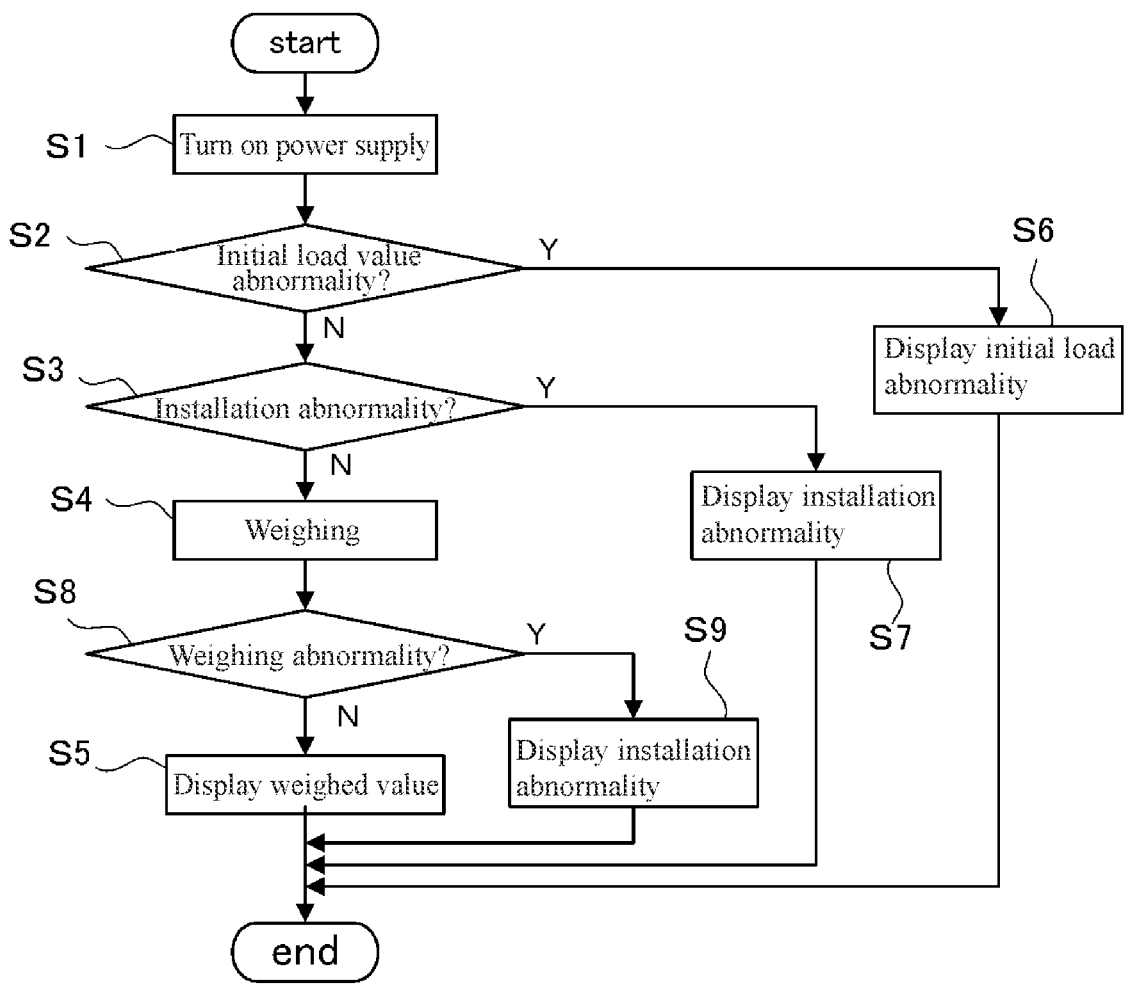
FIG. 5 is a flowchart including an abnormality diagnosis different from that in FIG. 4.

Further, in the embodiment described above, it is also possible that the abnormality detection means 39 performs another abnormality detection by using output values of the respective weighing sensors 42. For example, the control flow in FIG. 5 illustrates an example of detection of an abnormality during weighing (hereinafter, referred to as a weighing abnormality). To the control flow illustrated in FIG. 5, Step S8 and Step S9 are added as compared with the control flow illustrated in FIG. 4. Other steps are the same, and descriptions thereof will be omitted.

At the time of weighing in Step S4 in FIG. 5, output values of the respective weighing sensors 42 are stored in the memory, and based on the status of change or the status convergence of the stored output values, a weighing abnormality is judged (Step S8). When it is judged that a weighing abnormality has occurred, a display indicating the weighing abnormality is performed (Step S9).

FIGS. 6A to 6D are explanatory diagrams describing such weighing abnormalities, and FIGS. 6A to 6D respectively illustrate examples of occurrences of weighing abnormalities. In FIGS. 6A to 6D, the dotted line indicates a change in output value of a weighing sensor in which an abnormality has occurred, and the solid line indicates a change in output value of the other (normal) three weighing sensors.

The output values of the other three weighing sensors are not completely coincident, however, on the assumption that they show substantially the same tendency, a typical change is schematically illustrated. T1 in FIGS. 6A, 6B, 6C, and 6D represents a time when a to-be-measured subject got on the weighing base 12, and T2 represents a time when the weighed value became stable indicated as a guide.

Figure 6A:
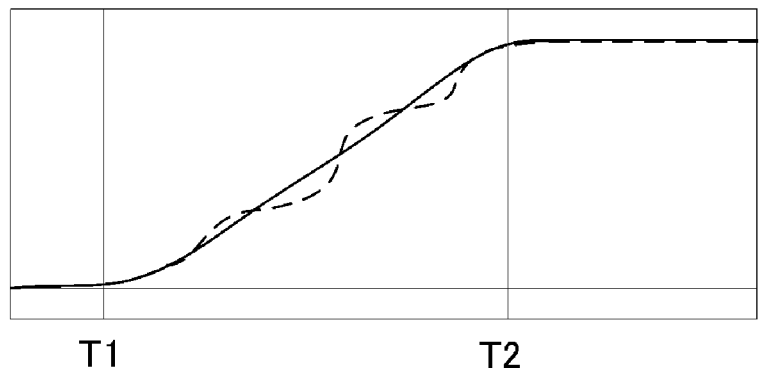
FIGS. 6A, 6B, 6C, and 6D are schematic diagrams describing examples of the abnormality diagnosis in FIG. 5.
Figure 6B:
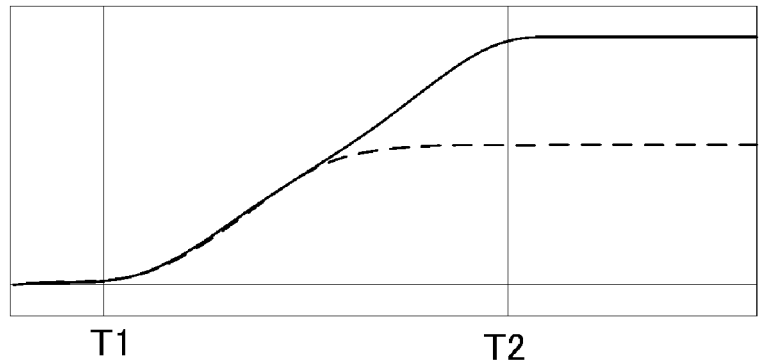
Figure 6C:
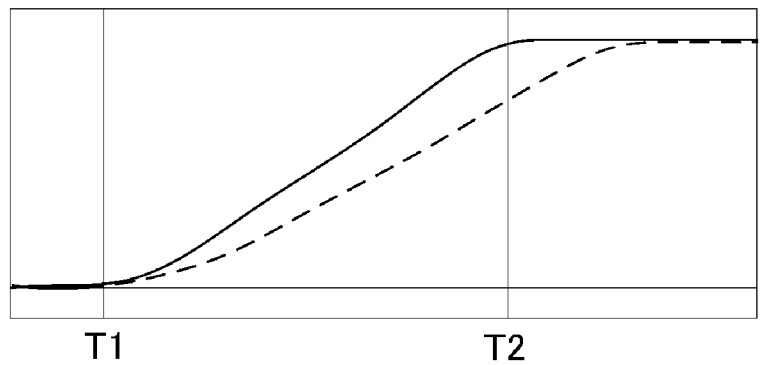
Figure 6D:
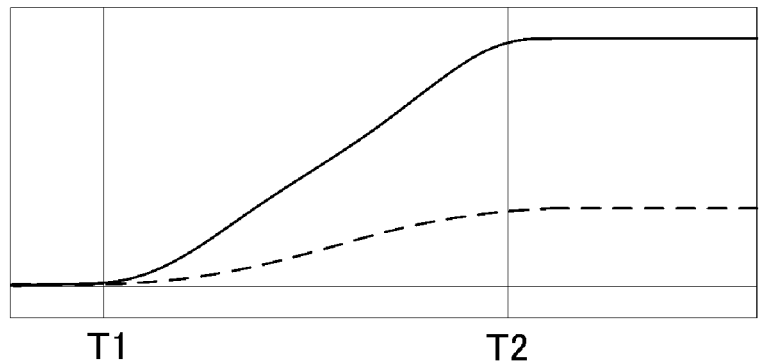

In the example illustrated in FIG. 6A, the output value (dotted line) of one weighing sensor 42 shows an unstable change as compared with the output value (solid line) of the other weighing sensors 42, and it is judged that an abnormality has occurred. In the example illustrated in FIG. 6B, only the output (dotted line) of one weighing sensor 42 converges sooner than the output (solid line) of the other weighing sensors 42, and it is determined that the weighing base 12 has come into contact with a floor or a foreign object in a periphery of the weighing sensor 42. In the example illustrated in FIG. 6C, only the output (dotted line) of one weighing sensor 42 converges later than the output (solid line) of the other weighing sensors 42, and it is judged that an abnormality in which the weighing base 12 comes into contact with and is interfered with by a floor or a foreign object, or an abnormality in which fixation of the weighing sensor 42 becomes unstable, has occurred. In the example illustrated in FIG. 6D, only the convergence value of the output (dotted line) of one weighing sensor 42 is much smaller than the convergence value of the output (solid line) of the other weighing sensors 42, and it is judged that a malfunction or fixation failure of the weighing sensor 42 has occurred, or an abnormality caused by contact with a foreign object in a periphery of the weighing sensor 42 has occurred. Thus, by comparing an output value of each weighing sensor 42 with output values of the other weighing sensors 42, an abnormality can be detected even during weighing processing. By making the comparison described above, it is also possible to identify a weighing sensor in which an abnormality is judged to have occurred, and make a notification of this.

In the embodiment described above, a description has been given of the weighing apparatus 10 by using an example of a large weight scale for medical use, however, without limitation to this, the present invention is applicable to various weighing apparatuses such as platform scales and balances as well as small weight scales for home use, weight scales with body fat scales and weight scales with stadiometers.

REFERENCE SIGNS LIST

10: Weighing apparatus, 12: Weighing base, 14: Handrail, 16: Display, 18: Slope, 20: Slip resistance, 22: Side bar, 24: Side bar, 26: Handle, 28: Wheel, 30: Pole, 32: Leg, 34: Display screen, 36: Operation button, 38: Control unit, 39: Abnormality detection means, 40: Power supply, 42: Weighing sensor, 44: Amplifier

The invention claimed is:

1. A weighing apparatus comprising a rectangular weighing base on which a to-be-weighed object is placed, weighing sensors disposed at four corners of the weighing base, and a control unit configured to calculate a weighed value of the to-be-weighed object on the weighing base based on output values of the weighing sensors, wherein the weighing apparatus comprises an abnormality detection means configured to detect occurrence of an abnormality based on a sum of output values of a pair of the weighing sensors disposed on one side of the weighing base, and wherein the abnormality detection means detects the abnormality by comparing a sum of output values of the pair of weighing sensors with a sum of past output values of the pair of weighing sensors.

2. The weighing apparatus according to claim 1, wherein the past output values are past output values in a no-load state of the weighing base, and the abnormality detection means compares a sum of output values of the weighing sensors at the time of power supply input with the past output values.

3. The weighing apparatus according to claim 2, wherein the abnormality detection means identifies a pair of weighing sensors in which an abnormality is judged to have occurred, and makes a notification of them.

4. The weighing apparatus according to claim 3, wherein the weighing apparatus is movable, and the abnormality detection means detects an installation abnormality when the weighing apparatus is moved and installed.

5. The weighing apparatus according to claim 2, wherein the weighing apparatus is movable, and the abnormality detection means detects an installation abnormality when the weighing apparatus is moved and installed.

6. The weighing apparatus according to claim 1, wherein the abnormality detection means identifies a pair of weighing sensors in which an abnormality is judged to have occurred, and makes a notification of them.

7. The weighing apparatus according to claim 6, wherein the weighing apparatus is movable, and the abnormality detection means detects an installation abnormality when the weighing apparatus is moved and installed.

8. The weighing apparatus according to claim 1, wherein the abnormality detection means identifies a pair of weighing sensors in which an abnormality is judged to have occurred, and makes a notification of them.

9. The weighing apparatus according to claim 8, wherein the weighing apparatus is movable, and the abnormality detection means detects an installation abnormality when the weighing apparatus is moved and installed.

10. The weighing apparatus according to claim 1, wherein the weighing apparatus is movable, and the abnormality detection means detects an installation abnormality when the weighing apparatus is moved and installed.

11. The weighing apparatus according to claim 1, wherein the weighing apparatus is movable, and the abnormality detection means detects an installation abnormality when the weighing apparatus is moved and installed.

* * * * *